(No Model.)

I. DUNN & W. B. DUNN, Jr.
POTATO CUTTER.

No. 499,101. Patented June 6, 1893.

WITNESSES:
John A. Rennie.
C. Sedgwick

INVENTORS:
I. Dunn
BY W. B. Dunn Jr
Munn & Co
ATTORNEYS.

UNITED STATES PATENT OFFICE.

ISAAC DUNN AND WILLIAM B. DUNN, JR., OF NEW BRUNSWICK, NEW JERSEY.

POTATO-CUTTER.

SPECIFICATION forming part of Letters Patent No. 499,101, dated June 6, 1893.

Application filed March 7, 1893. Serial No. 464,979. (No model.)

*To all whom it may concern:*

Be it known that we, ISAAC DUNN and WILLIAM B. DUNN, Jr., of New Brunswick, in the county of Middlesex and State of New Jersey, have invented a new and Improved Potato-Cutter, of which the following is a full, clear, and exact description.

The object of the invention is to provide a new and improved potato cutter, which is simple and durable in construction, and arranged to facilitate the cutting of potatoes for seeding purposes, without danger of bruising or injuring the potato skin or the eyes thereof.

The invention consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1:
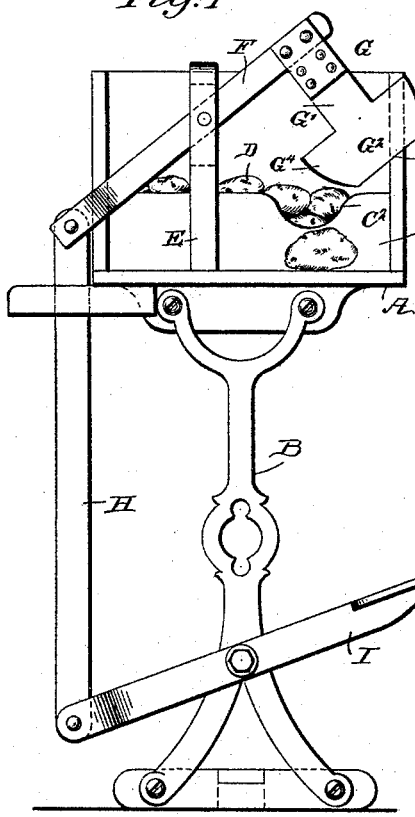
Figure 2:
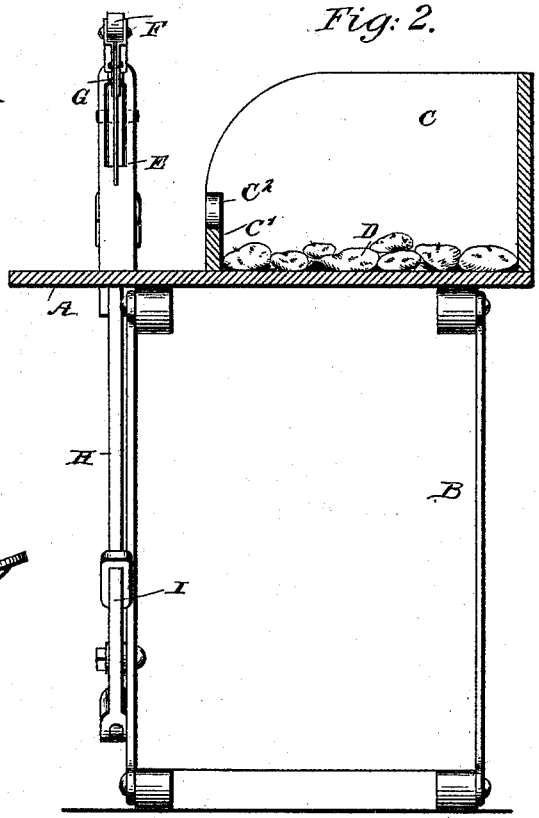
Figure 3:
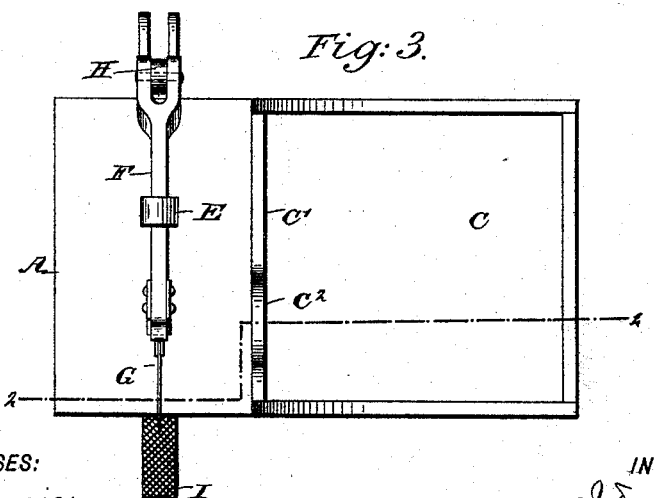

Figure 1 is a side elevation of the improvement. Fig. 2 is a sectional front view of the same on the line 2—2 of Fig. 3; and Fig. 3 is a plan view of the same.

The improved potato cutter is provided with a table A, mounted on a suitable stand B, and supporting at one side, a box C, containing the potatoes D to be cut into pieces for seeding purposes. The box C has one side C' formed with an opening $C^2$, to form a rest for the operator's arm, to enable him to conveniently handle the potatoes while cutting the same into parts, as hereinafter more fully described.

On the table A, and at one side of the box C, is arranged a post E in which is pivoted an arm F, carrying at its front end a knife G, and pivotally connected at its rear end by a link H, with a treadle I under the control of the operator's foot. The knife G is provided with a shank G', secured on the forward end of the transverse arm F and with a blade $G^2$, formed with a cutting edge, of which the bottom part $G^3$ is straight and the ends $G^4$ and $G^5$ are curved or rounded, as is plainly shown in Fig. 1.

The arm F and the knife G are so arranged in relation to the table A, that when the treadle I is pressed the forward end of the arm G swings downward to bring the bottom part $G^3$ of the cutting edge of the blade $G^2$ flush with the top surface of the said table A. Now, it will be seen that when a potato is placed below the knife G and the treadle I is pressed, then the curved part $G^4$ of the blade first strikes the potato and cuts into the same, until finally the bottom part $G^3$ finishes the cut, as the blade $G^2$ swings downward and rearward whenever the arm F receives a swinging motion with its front end downward. It will be seen that by this arrangement a shearing cut is given to the potato, and hence the skin is not bruised, as is so frequently the case in potato cutters as now constructed.

It will be further understood that by the arrangement described the operator is enabled to conveniently manipulate the potato under the knife G, so as to prevent cutting of the eyes and consequent spoiling of the potato for seeding purposes.

Having thus fully described our invention, we claim as new and desire to secure by Letters Patent—

1. A potato cutter, comprising a box adapted to contain the potatoes, said box being provided with an opening to form a rest for the operator's arm, an arm mounted to swing and under the control of the operator, and a knife secured to the front end of the said arm, the knife comprising a shank and a blade of greater breadth than the shank, the blade having a cutting edge formed with a straight bottom part and curved or rounded ends, substantially as shown and described.

2. In a potato cutter, the combination, with a stand, a table supported by the same, and a box for storing the potatoes to be cut, said box being constructed substantially as described, of a treadle pivoted to the said stand, a vertical link connected with the treadle, a post erected on the table, an arm pivoted on the post and connected with the said vertical link, and a knife secured to the front end of the arm and comprising a shank and a blade of greater breadth than the shank, substantially as shown and described.

ISAAC DUNN.
WILLIAM B. DUNN, JR.

Witnesses:
JAMES A. ROSS,
JAMES M. DUNN.